United States Patent
Mann

(10) Patent No.: US 6,446,862 B1
(45) Date of Patent: Sep. 10, 2002

(54) POINT OF PURCHASE (POP) TERMINAL

(76) Inventor: W. Stephen G. Mann, 284 Bloor Street West, Suite 701, Toronto, Ontario (CA), M5S 3B8

(*) Notice: Subject to any disclaimer, the term of this patent is extended or adjusted under 35 U.S.C. 154(b) by 0 days.

(21) Appl. No.: 09/480,929

(22) Filed: Dec. 31, 1999

(51) Int. Cl.$^7$ ............................................ G06K 5/00
(52) U.S. Cl. ............................... 235/380; 235/382
(58) Field of Search ............................ 235/380, 382; 709/206

(56) References Cited

U.S. PATENT DOCUMENTS

| | | | |
|---|---|---|---|
| 3,833,300 A | | 9/1974 | Rymes |
| 4,035,792 A | * | 7/1977 | Price et al. ............ 235/128 X |
| 4,220,400 A | | 9/1980 | Vizenor |
| 4,636,866 A | | 1/1987 | Hattori |
| 4,806,011 A | | 2/1989 | Bettinger |
| 5,095,326 A | | 3/1992 | Nozaki et al. |
| 5,323,264 A | | 6/1994 | Kato |
| 5,331,333 A | | 7/1994 | Tagawa et al. |
| 5,546,099 A | | 8/1996 | Quint et al. |
| 5,664,244 A | | 9/1997 | Yamamura et al. |
| 5,692,227 A | | 11/1997 | Yokota et al. |
| 6,023,723 A | * | 2/2000 | McCormick et al. ....... 709/206 |
| 6,036,093 A | * | 3/2000 | Schultz .............. 235/462.44 |
| 6,098,879 A | * | 8/2000 | Terranova ............ 235/384 |
| 6,152,591 A | * | 11/2000 | McCall et al. ........ 235/380 X |
| 6,182,893 B1 | * | 2/2001 | Greene et al. ........ 235/380 |
| 6,182,894 B1 | * | 2/2001 | Hackett et al. ........ 235/380 |

FOREIGN PATENT DOCUMENTS

JP        411066437 A   *  3/1999

OTHER PUBLICATIONS

"Wearable Computing: A First Step Toward Personal Imaging" by Steve Mann, Computer, vol. 30, No. 2, Feb. 1, 1997, pp. 25–32, XP000722152.

* cited by examiner

Primary Examiner—Karl D. Frech
Assistant Examiner—Allyson Sanders

(57) ABSTRACT

A wearable or carryable means typically for being owned, operated, and controlled by an individual buyer allows a purchase to be directed, at least in some parameters, by the buyer. The seller may be a representative of a large organization. The apparatus enables collegial identification of officials representing a seller organization. The invention provides an incidentalist identificational procedure, so that legitimate officials are not offered by a buyer using the invention when the buyer might otherwise be perceived as disrespectful by demanding identification from the seller. The apparatus also allows the buyer to select and control the advertisements displayed to the buyer, rather than leaving this matter up to the sole discretion of the seller.

28 Claims, 6 Drawing Sheets

Point of Purchase (PoP) TERMINAL

| | |
|---|---|
| 100 — SELL | BUY (PURCHASE) — 101 |
| 102 — SELLER | BUYER (PURCHASER) — 103 |
| 104 — ON SALE | PURCHASED — 105 |
| 106 — PoS TERM. | PoP TERM. — 107 |

FIG. 1a = TRADITIONAL SELLER PUSH (SELL) PARADIGM VERSUS BUYER PULL (PURCHASE) PARADIGM

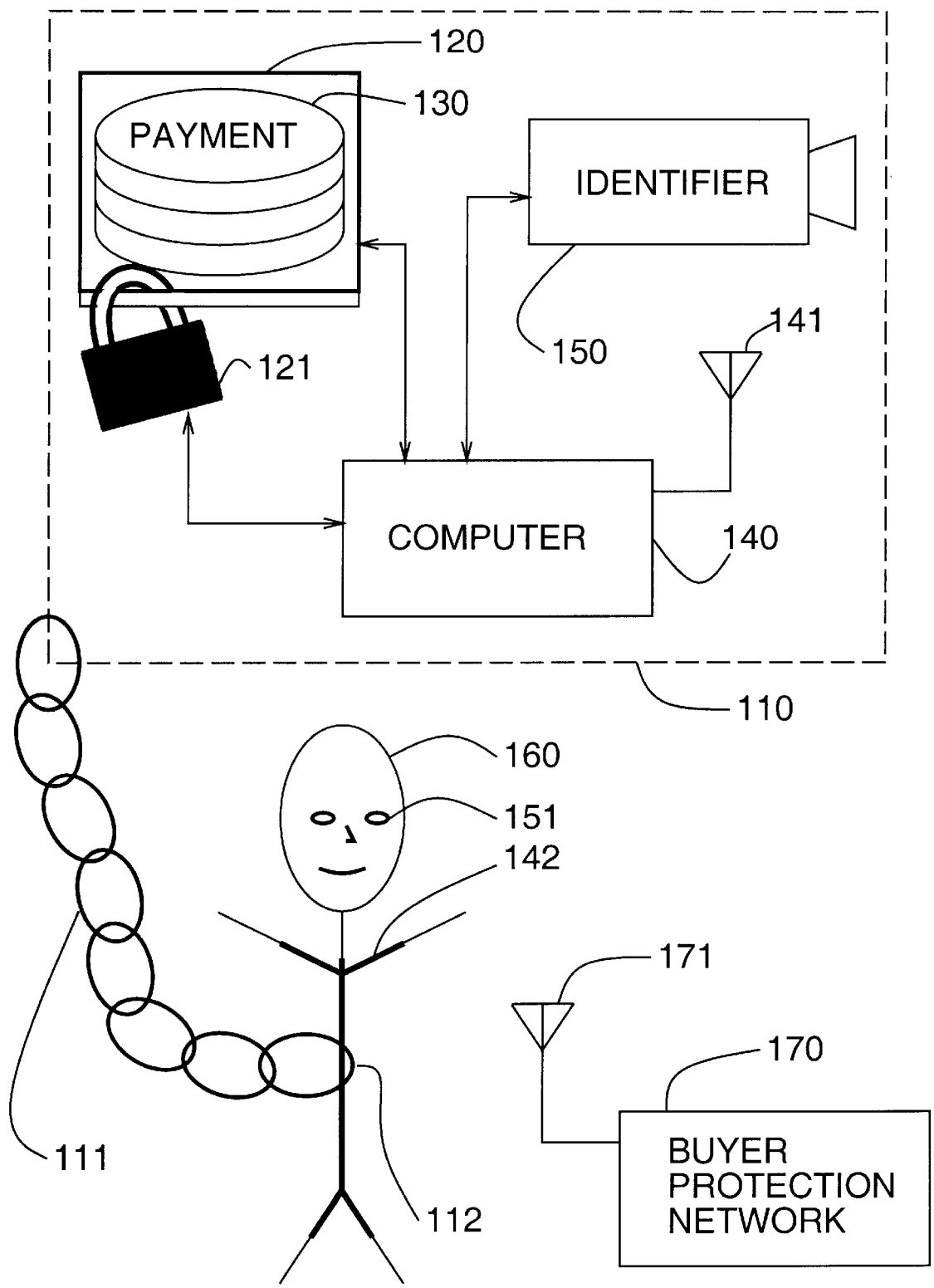
FIG. 1b = Point of Purchase (PoP) TERMINAL

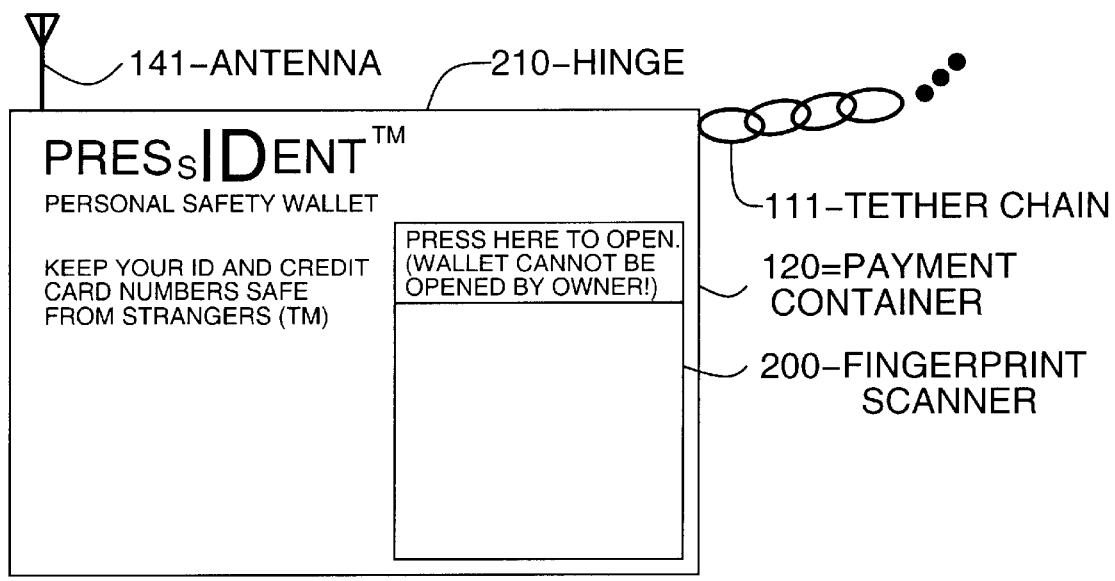
FIG 2 – SAFETY WALLET WITH FINGERPRINT SCANNER

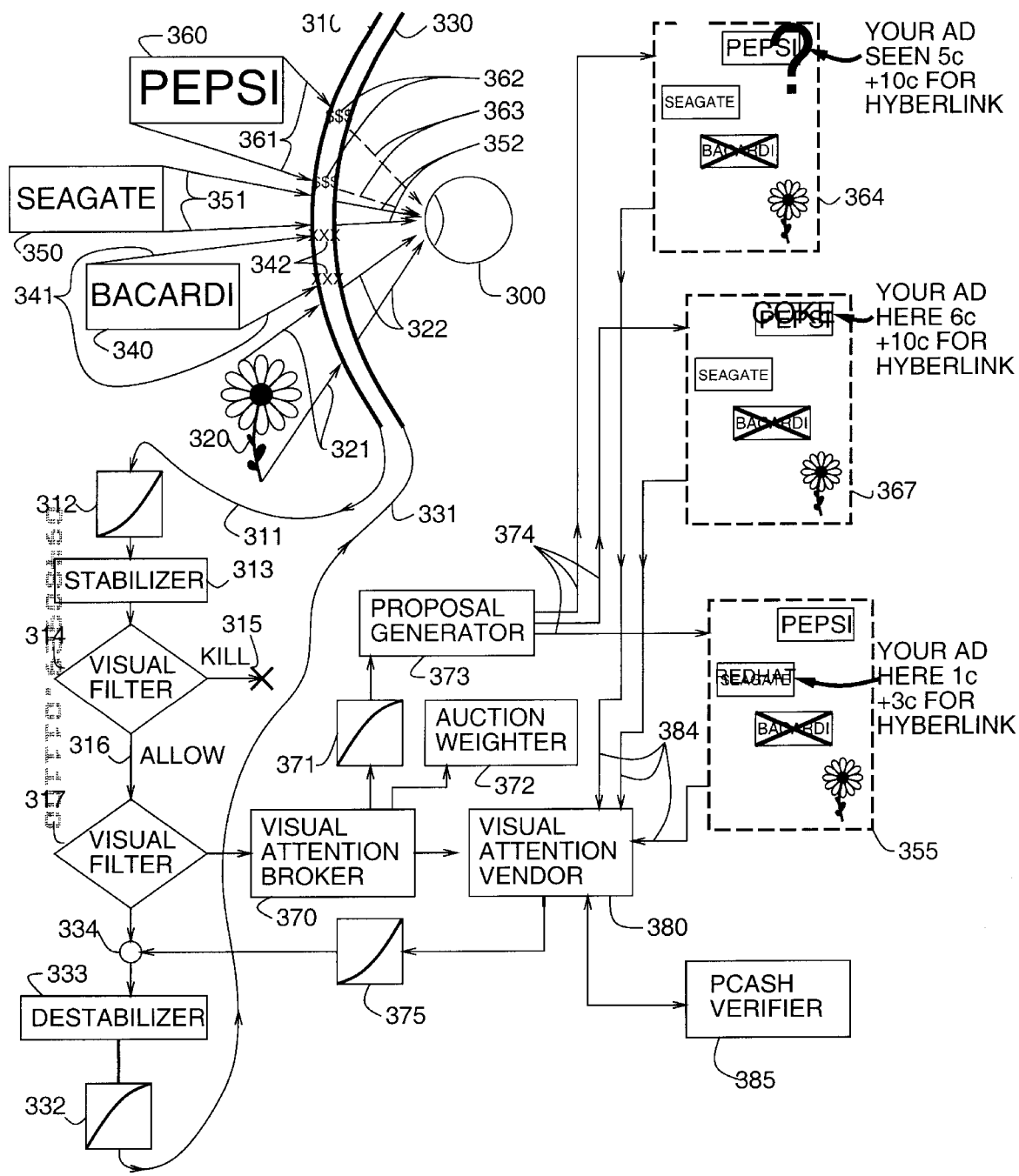
FIG. 3 = BUYER CONTROLLED ADVERTISING SYSTEM

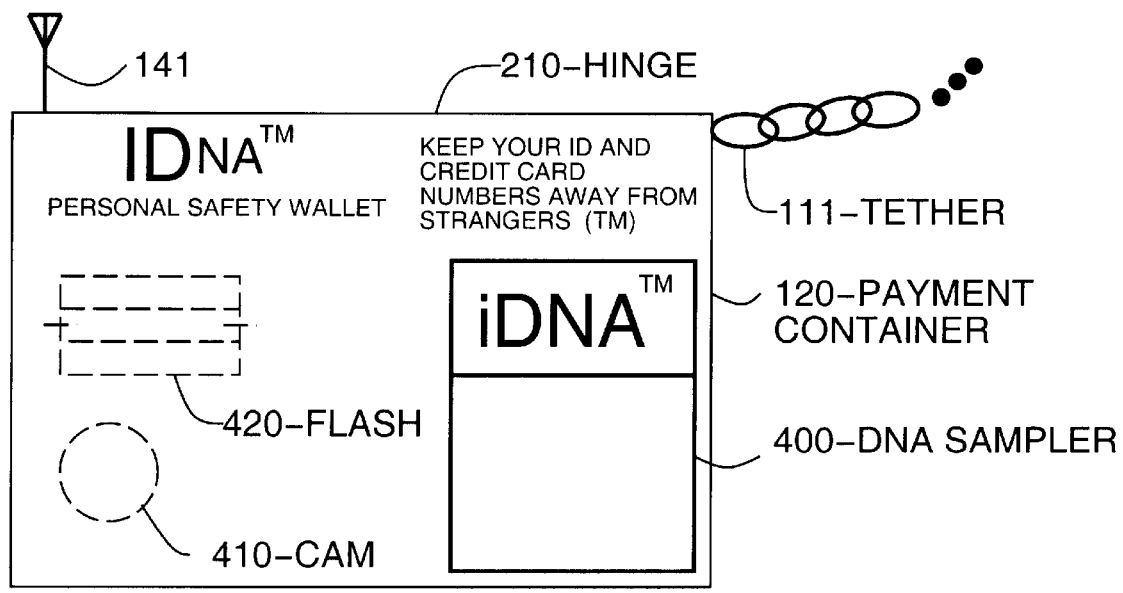
FIG 4 – SAFETY PHOTO WALLET WITH DNA SAMPLER

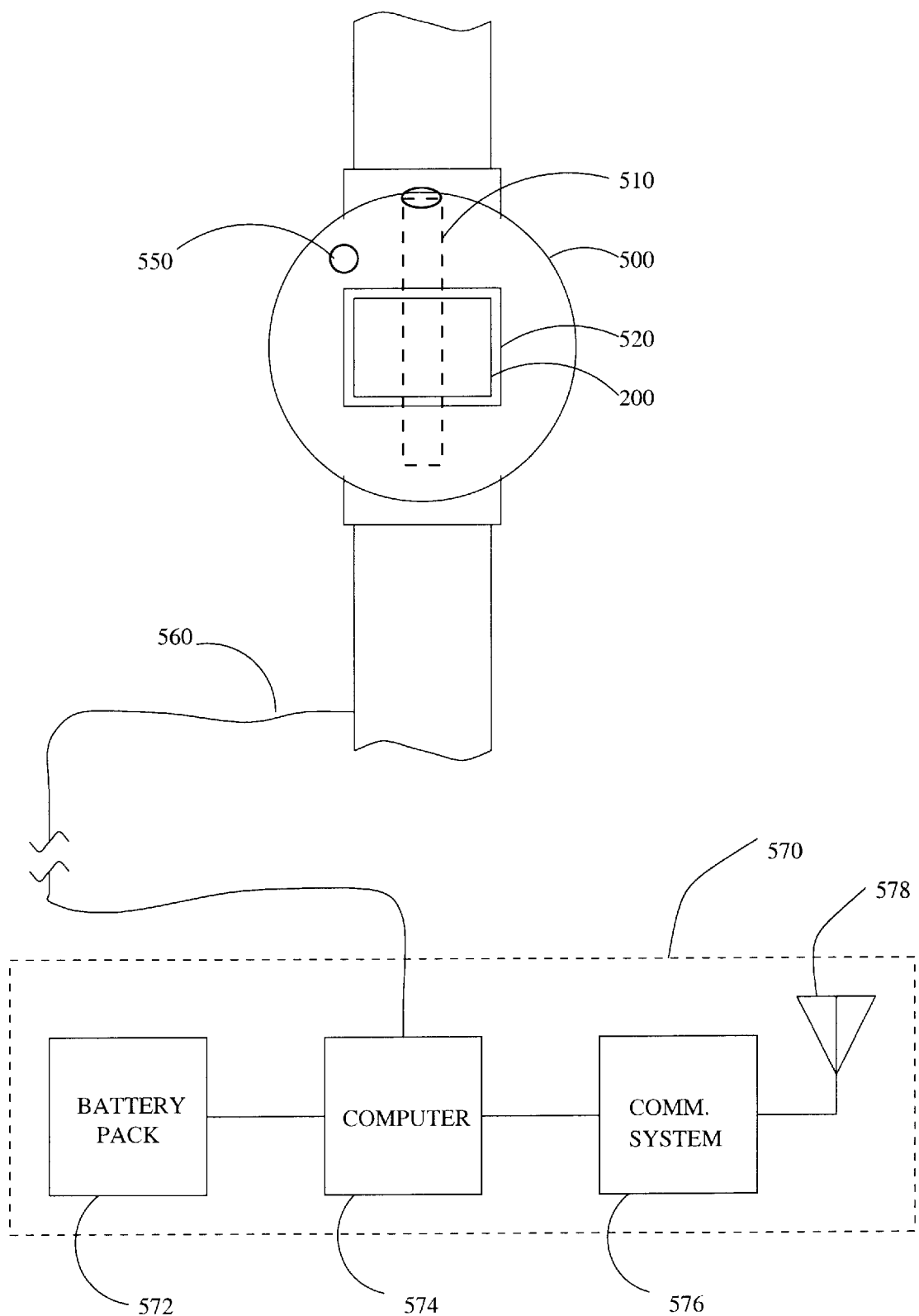
FIG. 5 - WRISTWATCH BASED APPARATUS FOR IDENTIFICATION OF OFFICIALS

POINT OF PURCHASE (POP) TERMINAL

FIELD OF THE INVENTION

The present invention pertains generally to a wearable or carryable apparatus typically owned, operated, and controlled by an individual person, for the individual to use in controlling the parameters of a purchase from a seller, where the seller may be either an individual or an organization.

BACKGROUND OF THE INVENTION

Most purchases are made between an individual buyer and a seller who is either an organization or a representative of an organization. Such a situation places the individual buyer at a disadvantage as compared to the organization. Moreover, organizations often set the stage, and control the parameters of the purchase. For example, organizations often maintain strict control over the environment in which the purchase is made. This control may include security systems, hidden video surveillance cameras, collection of customer profiles, and the like. At the same time, many representatives of seller organizations shirk responsibility by not wearing their name tags, deliberately putting on their name tags backwards so their names don't show, and refusing to identify themselves when asked for their names.

The old aphorisms "The customer is king", or "The customer is always right" have little bearing on the actual order of business within most sellers' establishments, in the sense that the seller is generally in control (e.g. "king") of the process. For example, there is typically a so-called Point of Sale (PoS) terminal operated by the seller, whereas the buyer merely stands by patiently and lets the seller lead the way through the procedure. In almost all aspects of the transaction, ranging from designing advertisements, selecting the venue for the advertisements, setting the prices, designing the conditions of the sale, etc., the seller is typically in control.

Frequently a seller will ask a buyer to show various pieces of identification and provide vast amounts of personal information for a seller database, junk mail lists, and the like, yet the buyer will often refuse to provide even his or her name, let alone personal information such as home phone number, mailing address, and the like.

However, when one considers the damage that may arise from a lack of buyer or seller accountability, especially in low cost items the seller may at most lose the purchase price of the transaction, whereas the buyer is at far greater risk. For example, defective products like automotive parts (brake pads, safety products, etc.) can lead to extensive damage to a buyer's car, as well as putting the health and safety of the buyer and others at great risk. Other products such as pharmaceuticals, when defective, can inflict far greater damage to a buyer's health than the cost of the transaction. It is often not just the manufacturer to blame in matters of defective product. There is a growing number of grey-market dealers, knowingly selling defective pharmacy products. Numerous other defective products are distributed by sellers fully aware of their dangerous and often illegal actions. Moreover, many such sellers are dangerously arrogant and unaccountable.

Other examples where seller accountability is often lacking arise in the food production and restaurant businesses. Many restaurant owners knowingly maintain less than hygienic conditions. Although the seller representative may not be the person directly responsible for these conditions, the seller representative is typically connected in some way to the organization, if by no other means than the seller representative being an employee of the organization.

Moreover, a seller may provide a buyer with products containing trojan horses or viruses. For example, a seller may sell a computer program containing a malicious virus, or a trojan horse installed for espionage benefiting the seller.

Likewise for those selling services. Consider, for example, a doctor. Anyone could pretend to be a doctor, and display a fake certificate in an office. If a patient were to demand to see a copy of the doctor's photo ID, this would be seen as disrespectful of the patient, and would likely offend the doctor, even though the doctor may ask the patient to see some photo ID (such as health care or the like to prove the existence of payment capability, insurance coverage, or the like).

Shopkeepers and other building owners have developed means and apparatus for containment, confinement, and other forms of processing they wish to apply to individuals passing through their establishments.

U.S. Pat. No. 4,341,165 describes a revolving door which allows the building owner to entrap and detain persons suspected of shoplifting, stealing, or the like. U.S. Pat. No. 4,586,441 describes a similar invention that also analyzes the individual so entrapped. U.S. Pat. No. 4,461,221 describes a system for detaining robbers on premises. U.S. Pat. No. 4,341,165 also describes a similar system. U.S. Pat. No. 5,311,166 describes a system for directing water and chemical weapons on undesirable persons centering a premises. U.S. Pat. No. 5,528,220 describes a device that automatically sprays chemical weapons on individuals entering an area where the owners of the establishment would prefer that individuals not enter.

In addition to access control, there are also perimeter security devices such as that disclosed in U.S. Pat. No. 5,182,764 to scan individuals for weapons, and other forms of devices that allow officials or security guards to see through clothing to inspect individuals. Some systems allow officials to secretly search individuals without their knowledge or consent, and without any kind of due process, despite the fact that such searches are often illegal and unconstitutional.

Environments in which the establishment owners are in control are well known in the prior art. U.S. Pat. No. 4,796,311 describes an intake facility whereby individuals may be required to undress completely, while being viewed by facility owners or the like, who can also monitor and control a decontamination process. U.S. Pat. No. 4,858,256 and U.S. Pat. No. 5,551,102 describe similar "decon" systems, whereby an individual may be prevented from passing from one section to another unless the individual complies with orders or requirements of those in control.

Historically, showers with airtight and watertight locking doors that cannot be opened by the occupants have been used to subject the occupants to various chemical substances. Such practices and procedures are well known in the prior art.

On the other hand, very little has been done to protect the individual from the forces of establishments.

Although physical protection of the body through armour is a centuries-old aspect of the prior art, dating back to the days when five to seven layers of rhinoceros skin were used to protect the body during battle, such physical protection of the body has not kept pace with new developments in the protection of establishments. Protection of establishments has evolved from the physical protection of medieval fortresses to information protection such as that used in bank towers with glass doors protected by card readers and retinal scanners. Thus the protection of establishments has moved from the physical era of the stone fortress to the informational era of biometrics.

The protection of the body has not kept pace with this move from physical stone fortresses to informational protection of buildings.

Online shopping has evolved with methods of protecting the shopper from unwanted advertising (spam), but these protective measures (e.g. spam filters) only apply to cyberspace and still fail, in the real world (e.g. outside cyberspace), to protect the buyer from manipulation by the seller.

BRIEF DESCRIPTION OF THE DRAWINGS

The invention will now be described in more detail, by way of examples which in no way are meant to limit the scope of the invention, but, rather, these examples will serve to illustrate the invention with reference to the accompanying drawings, in which:

FIG. 1a illustrates aspects of the traditional seller push model and serves to define the difference between sale and purchase, as well as the differences between Point of Sale (PoS) and Point of Purchase (PoP) systems.

FIG. 1b illustrates the Point of Purchase terminal and its various components.

FIG. 2 illustrates an embodiment of the PoP terminal which acquires a valid fingerprint scan of a seller's finger.

FIG. 3 illustrates an embodiment of the PoP terminal in which the identifier, in effect, comprises an eye of the buyer, by way of a reality mediator that taps into the eye of the buyer when the buyer wears an eyeglass based embodiment of the PoP terminal system.

FIG. 4 illustrates another embodiment of the buyer's PoP terminal having a DNA sampler that collects DNA when the seller opens it to take his or her payment, this embodiment of the invention also having a camera configured so that the act of opening it also automatically takes a picture or beings recording video documentary of a transaction between buyer and seller.

FIG. 5 shows an embodiment of the invention built into a wristwatch which similarly captures video and is also equipped with a fingerprint scanner.

DETAILED DESCRIPTION OF THE PREFERRED EMBODIMENTS

While the invention shall now be described with reference to the preferred embodiments shown in the drawings, it should be understood that the description is not to limit the invention only to the particular embodiments shown but rather to cover all alterations, modifications and equivalent arrangements possible within the scope of the appended claims.

In all aspects of the present invention, references to "camera" mean any device or collection of devices capable of simultaneously determining a quantity of light arriving from a plurality of directions and or at a plurality of locations, or determining some other attribute of light arriving from a plurality of directions and or at a plurality of locations.

Similarly references to "identifier" shall include devices such as face recognizer camera vision systems, fingerprint scanners, and the like, as well as devices that capture a sample of data for later identification, such as devices that collect a DNA sample. Thus devices that collect data contributing to an evidentiary trail, even if that data needs to be analyzed later, will be referred to as identifiers.

References to "processor", or "computer" shall include sequential instruction, parallel instruction, and special purposes architectures such as digital signal processing hardware, Field Programmable Gate Arrays (FPGAs), programmable logic devices, as well as analog signal processing devices.

When it is said that object "A" is "borne" by object "B", this shall include the possibilities that A is attached to B, that A is bonded onto the surface of B, that A is embedded inside B, that A is part of B, that A is built into B, or that A is B. An example of "A is B" might be a camera-bearing pair of eyeglasses, in which the eyeglasses themselves are a camera, in the sense that there is a CCD sensor array somewhere in the eyeglasses, a lens somewhere in the eyeglasses, and a cavity between the two that is part of the eyeglasses, and has no clearly separable portion that could be regarded as a separate entity.

References to monetary units are made using integers for simplicity, but may be understood to be fractional units of any currency, not just cents, and may also be other units not necessarily related to monetary units. The monetary units described (e.g. 5 cents, 6 cents, etc.) may equally be floating point values possibly monetary and possibly other units such as attentional value that might be an alternative to today's monetary currency systems. The amounts may also be scaled up or down drastically, e.g. to nanocents, picocents, or the like, or in minute units like picocents per integrated photon of advertisement source incident on a retinal cell, or integrated continuous units based on various probabilistic visibility measures.

FIG. 1a is a table depicting the traditional seller-push paradigm as compared to a buyer pull paradigm. On the left hand side of the table are the concepts of selling, and on the right hand side, those of buying (purchasing). Typically an organization will SELL 100, while an individual will BUY (PURCHASE) 101. The organization either is or comprises a SELLER 102 who may attempt to create a perceived need (e.g. through possibly manipulative advertisements, etc.) in the mind of BUYER (PURCHASER) 103. The SELLER 102 will place goods or services ON SALE 104, and define the terms of sale, conditions for selling, etc. In response to this action, a BUYER 103 may make a purchase decision, and eventually the good or service will have been PURCHASED 105 by BUYER 103. Traditionally, the SELLER 102 is in complete control of the procedure, notwithstanding the fact that the BUYER 103 is the one who allegedly makes the decision as to whether or not to BUY 101.

SELLER 102, either directly or through a representative (e.g. a cashier), operates a Point of Sale (PoS) terminal, sometimes referred to as, or including, a cash register or the like. For simplicity, both the seller, and representative of the seller, as well as the organization of the seller, will be referred to as "seller". Thus SELLER 102 depicts any and all representatives of an organizational structure selling goods or services.

A key inventive concept is a device to put the BUYER 103 in control of at least some elements of the procedural aspects of the transaction, such as collection of evidentiary data that might assist in rectifying differences of opinion or wrongdoing at a later date.

FIG. 1b is a diagram depicting a Point of Purchase (PoP) terminal 110. PoP terminal 110 includes a payment container 120 which contains payment 130. Payment may be coins, bills, gold pieces, digital cash, anonymous electronic cash, or other negotiables or valuables, or representatives thereof. Payment container 120 is secured with a lock 121. Lock 121 is typically controlled by a computer 140. Computer 140 may be a microprocessor, microchip, digital logic circuit, or the brain of the buyer 160, in which case control interface to lock 121 may be made by way of an implantable brain interface. Lock 121 may be an electromechanical lock on a physical container, or a cryptographic lock on a virtual container. Payment 130 may be a physical object, or an informatic object such as knowledge of a number that is money or the like.

PoP terminal 110 includes an identifier 150. Identifier 150 acquires evidentiary data pertaining to the seller, the seller's establishment, or the environment and conditions of the sale. This evidentiary data may include measurements such as acoustic vibrations, infrared or visible light energy, etc., as well as samples of particulate matter, such as might help determine by way of smell, information about the environment including identifying information from the seller (such as body smell, DNA samples, etc.). In the preferred embodiment of the invention, identifier 150 is a video camera that records a motion picture sequence or individual picture frames from multiple pictures, together with multiple sound channels from a plurality of microphones. The camera records pictures and multiple sound channels for later processing, including superresolution image enhancement and adaptive beamforming, null steering, and the like, in order to obtain a clearly discernible sound track despite acoustic disturbances such as machinery (as might arise, for example, in a section of a department store where vacuum cleaners are being demonstrated).

PoP terminal 110 is connected to buyer 160 by way of security tether 111. Tether 111 may be a chain, cable, or the like, which keeps at least some portions of the apparatus attached to the buyer's body, Preferably tether 111 is such that the buyer can thread it around his or her wrist, or other body anchor point 112, and then feed it into the open PoP terminal, such that access to the end is needed to detach the tether from the buyer, and access to the end needed to unthread the apparatus from the buyer's waist requires opening (unlocking) the apparatus. Alternatively, a special strap around a body anchor point 112 comprising the waist or ankle may be held in place by a cable similar to the lockdown cables used to prevent theft of laptop computers.

Alternatively, the tether may be wireless, such that a person stealing the PoP terminal will be subdued or marked with chemical means, such as that manufactured under the trade name Dye Witness (TM). A thief taking the PoP terminal beyond communications reach of a body anchor 112 comprising a corresponding wearable radio transmitter will simply cause the device to switch into a protective mode of spraying with chemicals. Likewise, attempts to force open or bypass the lock on the PoP terminal will result in similar discharge of chemical disincentives. Further identifiers may be mixed with the chemical disincentives. For example, a unique colour may be imparted to each manufactured unit, so that subtle differences in shading of the dyes may identify the recipient of the chemical marking as being the perpetrator of a particular crime. The chemicals may also contain pico technology, such as picoscale identifiers that are carried by the perpetrator.

In the preferred embodiment, body anchor point 112 comprises a wearable radio link contained in a wearable computer system 142, and the PoP terminal 110 is secured by a radio frequency tether 111.

Payment container 120 (with lock 121), identifier 150, and computer 140 may be in a single housing 110, or may be physically separate but still connected by communications links such as wireless transceivers or the like. Any combination is possible, for example, two of these three items may be together in a housing, and the third may be separate.

In some embodiments of the invention, computer 140 is contained in the buyer's clothing, so that wearable computer system 142 performs the function of computer 140.

In a second preferred embodiment, identifier 150 comprises the use of at least one eye 151 of the buyer 160, wherein the buyer 160 wears special eyeglasses that, in effect, cause the eye itself to function as a camera. The eyeglasses also contain a number of microphones that function as a phased array system for (together with the tapping of eye 150) capturing a video recording of the transaction between the seller and the buyer. In this second preferred embodiment, wearable computer system 142 unlocks lock 121 that secures payment container 120. In this second preferred embodiment, payment container 120 is in the form of a wallet, or wallet-like structure, and tether 111 joins payment container 120 to buyer 160, rather than joining the whole PoP terminal of buyer 160.

Additionally, computer 140 or wearable computer 142 (or both, as the case may be) communicate with a buyer protection network 170. In the preferred embodiment, this communication is facilitated by way of wireless communications transceivers 141 and 171.

A fundamental inventive concept behind the apparatus of FIG. 1b is in the way in which the locus of control is transferred to the buyer, in contrast to traditional Point of Sale terminals that pull all the control in the heads of the seller. Just as Point of Sale terminals (e.g. cash registers and the like) often incorporate hidden video surveillance cameras located behind a dark plexiglas window in the cash register, the PoP terminal also can collect evidentiary data.

Another important inventive concept is that of subservience empowerment in which a cashier is traditionally empowered with the ability to deny locus of control. Most notably, a cashier can simply say "I'm just following company policy" when asked to negotiate terms of sale. In many cases a seller will pretend to not be in control of his or her situation. For example, a seller might say "I can't give you a refund, my machine won't let me", or "I can't give you the discount, the cash register [or my manager] won't let me".

In order to create a balanced situation, it is desirable for the PoP terminal to provide similar functionality, by providing the buyer with the same kind of subservience empowerment. Thus it is desirable to have at least one mode of operation in which the buyer may relinquish control to a remote "manager" such as a spouse remotely logged in over a computer network to computer 140 or wearable computer 142, or a buyer protection network 170. In this way, the seller can not know for certain whether the buyer is in control of his or her own actions. Accordingly, the buyer can claim the same kind of "my manager" subservience that the seller often does. For example, the buyer can say "I'd really like to purchase this item, but my manager won's let me unless the following terms are met . . . ".

The buyer can also claim or allege that the existence of the identifier 150 is required by a remote entity. Therefore, just as the seller will often cite management as the source of video surveillance cameras even if he or she installed them himself or herself, the buyer can also, with the invention, do the same. The buyer can also claim or infer that identifier 150 arises out of company policy, insofar as the buyer may be running errands on company time to make purchases on behalf of a remote corporate manager, by way of buyer protection network 170. In a sense, buyer protection network 170 may provide buyer 160 with a "management service" and accept blame for the buyer's actions. For this service, the buyer may pay a small fee to one or more buyer protection network services.

An important aspect of the invention is the uncertainty that the buyer can inflict upon the seller. For example, the buyer may or may not be making a detailed documentary of the seller's behaviour and actions, and reporting to the buyer protection network 170. Since the sellers does not known whether or not, for example, he or she is under video surveillance, he or she will be on his or her best behaviour at all times, just as the customer (buyer 160) is by way of surveillance cameras installed in the seller's establishment. The seller also doesn't know whether or not the buyer may be doing some comparison shopping over a communications network. For example, the buyer may scan in price codes and prices and post these to a buyer protection network, so that by the time he or she reaches the checkout, he or she can be warned about overpriced items. Thus the PoP terminal ensures that the seller is fair and reasonable.

FIG. 2 depicts a version of the Point of Purchase terminal of the invention that uses a fingerprint scanner 200. The instructions printed on the PoP terminal are directed at a potential seller. The instructions simply direct the seller to press down on a certain portion of the wallet to open it. In a preferred embodiment of the finger scanning wallet, the fingerprint scanner portion of the wallet functions in much the same way as a fingerprint scanner similar to those used in the BioMouse (TM) computer fingerprint scanner.

The wallet has the capability to check to make sure the scanned fingerprint is a valid fingerprint and is not that of the owner, prior to releasing the mechanism that allows the wallet to open by way of hinge 210.

In this way the owner can declare that he or she is unable to open the wallet himself or herself. Having at least one mode of operation that embodies this subservience empowerment function enable the wallet to be used in an assertive fashion without a direct confrontation with the seller.

Thus an important aspect of this embodiment of the invention is the uncertainty in the seller's mind as to whether or not the buyer is in control of the situation. Obviously the seller cannot control the buyer if the buyer is (or can pretend to be) controlled by a remote entirety. A situation that is thus beyond the locus of control of the seller in at least aspects, thus puts the buyer and seller on an equal footing.

FIG. 3 depicts a wearable embodiment of the invention that includes buyer control of his or her perception of sellers' advertisements or propaganda. Headgear includes a lightspace analyzer 310 and a lightspace synthesizer 330, which collectively tap into at least one eye 300 of the wearer of the apparatus. The apparatus takes control of the visual information space seen by eye 300 from the seller and gives the control to the buyer (e.g. assuming the buyer is the wearer of the apparatus of the invention). Various advertisements that sellers place in the field of view of prospective buyers are filtered by the apparatus of the invention. For example, the buyer can decide that he or she does not wish to se any advertisements pertaining to alcoholic beverages. Therefore a BACARDI billboard 340 is filtered out. Rays 341 of light traveling from the BACARDI billboard 340 toward eye 300 are incident upon lightspace analyzer 310. These rays 341 stop at lightspace analyzer 310 and are not resynthesized by lightspace synthesizer 330. The "XXX" markings 342 denote the visual filtering out of the BACARDI billboard 340.

The wearer of the apparatus might be a computer hobbyist who is presently looking for good prices on computer hardware. Accordingly, A SEAGATE billboard 350 depicting the latest SEAGATE hard drive technology produces rays 351 of light that are absorbed by lightspace analyzer 310 and resynthesized by lightspace synthesizer 330, as synthetic (virtual) light rays 352. In this way, the light rays 352 which represent the visual contents of the SEAGATE billboard 350 pass into eye 300 in approximately the same way as they would in the absence of the apparatus of the invention.

Similarly natural subject matter 320 such as roadways, sidewalks, buildings, rays of light from the sky, and flowers, pass through the visual filter as rays 321 that are reconstructed as rays 322 and also enter eye 300.

Thus the wearer of the apparatus will see most objects in a somewhat natural manner, but certain other offensive visual matter will be filtered out.

Matter to which the wearer of the apparatus is indifferent may be put up for auction by the wearer of the apparatus. In this way, the wearer may receive payment for viewing billboards and similar advertisements. For example, if the wearer is indifferent to a PEPSI billboard 360, the light rays 361 from this billboard may be copied through the apparatus to tentative light rays 363, or may be blocked, depending on whether or not PEPSI COLA or one of the associated vendors working with PEPSI COLA pay the wearer a small fee for viewing the advertisement. The "$$$" symbols 362 denote this conditional blocking of the visual content in the PEPSI billboard 360.

Therefore the embodiment of the invention described in FIG. 3 put the buyer in control of his or her visual information space, instead of the seller being in control as has traditionally been the cause. Traditionally, sellers are free to buy or rent space in the visual field of view of buyers, and present potentially unsolicited (potentially unwanted) visual material of buyers. This so called spam may now be filtered out by way of the apparatus of the invention, so that the wearer of the special headgear can walk down a street and only see billboards he or she has decided are of interest, or alternatively, the buyer can filter out specific billboards that he or she decides are offensive or constitute spam.

In actual functioning, the apparatus takes in (absorbs and quantifies) rays of incoming light, into lightspace analyzer 310. Lightspace analyzer 310 is generally opaque (e.g. no light gets through it). However lightspace analyzer 310 converts incoming light into a numerical description 311 which is fed to a lightspace converter 312. The lightspace converter converts the numerical description 311 into a quantity that is linear in the photoquantity of incoming light (e.g. linearly proportional, up to a constant scale factor, to the amount of incoming light).

Typically, lightspace analyzer 310 may be approximated by an eye tap camera system that includes a Charge Coupled Device (CCD) sensor array.

In order to convert the output of a CCD camera to lightspace, the camera may be calibrated by taking a plurality of pictures differing only in exposure:

$$f_i(x) = f(k_i q(x)) \qquad (0.1)$$

where $k_i$ are scalar constants.

Such a set of functions, $f_i(x)$ describes a set of images differing only in exposure, when x=(x,y) is the continuous spatial coordinate of the focal plane of an electronic imaging array (or piece of film), q is the quantity of light falling on the array (or film) and f is the unknown nonlinearity of the camera's (or imaging system's) response function. Generally, f is assumed to be a pointwise function, e.g. invariant to x.

The quantity, q, in (0.1), is called the photoquantigraphic quantity, or just the photoquantity for short. This quantity is neither radiometric (radiance or irradiance) nor photometric (luminance or illuminance). Most notably, since the camera will not necessarily have the same spectral response as the human eye, or in particular, that of the photopic spectral liminous efficiency function as determined by the CIE and standardized in 1924, q is neither brightness, lightness, luminance, nor illuminance. Instead, photoquantigraphic imaging measures the quantity of light integrated over the spectral response of the particular camera system, $$q = \int_0^\infty q_s(\lambda) s(\lambda) d\lambda \qquad (0.2)$$

where $q_s(\lambda)$ is the actual light falling on the image sensor and s is the spectral sensitivity of an element of the sensor array. It is assumed that the spectral sensitivity does not vary across the sensor array.

The quantity q reads in units that are quantifiable (e.g. linearized or logarithmic), in much the same way that a photographic light meter measures in quantifiable (linear or logarithmic) units. However, just as the photographic light meter imparts to the measurement its own spectral response (e.g., a light meter using a selenium cell will impart the spectral response of selenium cells to the measurement) photoquantigraphic imaging accepts that there will be a particular spectral response of the camera, which will define the photoquantigraphic unit q. Each camera will typically have its own photoquantigraphic unit. In this way, the camera may regard as an array of lightmeters:

$$q(x, y) = \int_0^\infty q_{ss}(x, y, \lambda) s(\lambda) d\lambda \qquad (0.3)$$

where $q_{ss}$ is the spatially varying spectral distribution of light falling on the image sensor.

Thus varying numbers of photons of lesser or greater energy (frequency times (Planck's constant) are absorbed by a given element of the sensor array, and, over the temporal integration time of a single frame in the video sequence (or the picture taking time of a still image) result in the photoquantigraphic quantity given by Eq. 0.3.

In the case of a color camera, q(x,y) is simply a vector quantity, e.g. $[q_r(x,y), q_g(x,y), q_b(x,y)]$ where each component is derived from a separate spectral sensitivity function. In this disclosure, the theory will be developed and explained for greyscale images, where it is understood that most images are color images, for which the procedures are applied to the separate color channels. Thus in both cases (greyscale or color) the continuous spectral information $q_s(\lambda)$ is lost through conversion to a single number q or to typically 3 numbers, $q_r$, $q_g$, $q_b$.

Ordinarily cameras give rise to noise, e.g. there is noise from the sensor elements and further noise within the camera (or equivalently noise due to film grain and subsequent scanning of a film, etc.). Thus a goal of photoquantigraphic imaging is to attempt to estimate the photoquantity q, in the presence of noise. Since $q_s(\lambda)$ is destroyed, the best we can do is to estimate q. Thus q is the fundamental or "atomic" unit of photoquantigraphic image processing.

Most cameras do not provide an output that varies linearly with light input. Instead, most cameras contain a dynamic range compressor.

Therefore, to undo this effect, a dynamic range expander 312 is used to arrive at the lightspace photoquantity q that came from each object in the screen, etc. A typical function for the dynamic range compression gives an image $f_1 = f(q) = q^{1/2.22} = q^{0.45}$.

Thus a function suitable for expander 312 for undoing (approximately) this compression, e.g. darkening the midtones of the image after processing is $q = f^{-1}(f_1) = f_1^{2.22}$.

A better function for expander 312 may be derived as follows: First consider the classic model $$f(q) = \alpha + \beta q^\gamma \qquad (0.4)$$

used by photographers to characterize the response of a variety of photographic emulsions and electronics cameras.

Proposition 0.01 The comparametric plot corresponding to the standard photographic response function (0.4) is a straight line. The slope is $k^\gamma$, and the intercept is $\alpha(1-k^\gamma)$.

Proof: $g(f(kg)) = f(kq) = \alpha + \beta(kq)^\gamma$ Re-arranging to eliminate q gives $g = k^\gamma(\alpha + \beta q^\gamma) + \alpha(1-k^\gamma)$ so that:

$$g = k^\gamma f + \alpha(1-k^\gamma) \square \qquad (0.5)$$

Note that the constant $\beta$ does not appear in this comparametric equation. Thus we cannot determine $\beta$ from the comparametric equation. The physical (intuitive) interpretation is that we can only determine the nonlinear response function of a camera up to a single unknown scaler constant.

Applying (0.5) to lighten or darken an image will be called affine correcting (e.g. correcting by modeling the comparametric function with a straight line). The special case of affine correction when the intercept is equal to zero will be called linear correction.

Preferably affine correction of an image also includes a step of clipping values greater than 1 to 1, and values less than zero to zero, in the output image:

$$g = \min(\max(k^\gamma f + \alpha(1-k^\gamma), 0), 1) \qquad (0.6)$$

If the intercept is zero and the slope is greater than one, the effect, neglecting noise, of (0.6), is to lighten the image in a natural manner that properly simulates the effect of having exposed the image with greater exposure. In this case, the effect is theoretically identical to that which would have been obtained by using a greater exposure on the camera, assuming the response function of the camera follows the power law $f = q^\gamma$, as many cameras to in practice. Thus it has been shown that the correct way to lighten an image is to apply linear correction, not gamma correction (apart from correction of an image to match in incorrectly adjusted display device or the like, where gamma correction is still the correct operation to apply).

In the preferred embodiment of the invention, the expander function 312 is unicomparametric (bounded in normalized units between 0 and 1) and also has a parameter to control the softness of the transition into the toe and shoulder regions of the response function, rather than the hard clipping introduced by (0.6).

In particular, in the preferred embodiment expander 312 is the inverse of:

$$f(q) = (e^b q^a / (e^b q^a + 1))^c \qquad (0.7)$$

which works out to be:

$$q = a\sqrt{\frac{e^{-b}\sqrt[c]{f(q)}}{1-\sqrt[c]{f(q)}}} \quad (0.8)$$

The constant b in (0.7) is arbitrary, and it may be desired for simplicity to set this to zero, so that:

$$f(q)=(q^a/(q^a+1))^c \quad (0.9)$$

An intuitive understanding of (0.7) can be better had by re-writing it:

$$f = \begin{cases} \exp(1/(1+e^{-(a\log(q)+b)})^c)^c, & \forall q \neq 0 \\ 0, & \text{for } q = 0 \end{cases} \quad (0.10)$$

where the soft transition into the toe (region of underexposure) and shoulder (region of underexposure) regions is evident by the shape of this curve has on a logarithmic exposure scale.

This softness (less abrupt change) gives rise to a more pleasing and natural looking image in which computer-replaced advertisements look more realistic.

Once the numerical description 311 is converted to lightspace by way of expander 312, the image is stabilized by stabilizer 313. In the preferred embodiment, stabilizer 313 works on the flow of a rigid planar patch. Since most billboards spam is confined to a flat surface, this works most of the time. Stabilizer 313 may operate by way of projective flow or protective fit, together with projectivity plus gain estimation, as described in the lead article of Proceedings of the IEEE, Vol. 86, No. 11. The apparatus may also use positioning systems such as GPS, wearable RaDAR systems, inertial guidance, electronic compass systems, and the like, in addition to vision, in order to derive similarity metrics for ads, so that some of these materials can be location-based. For simplicity, consider, without loss of generality, visual-based methods.

In most stabilized coordinates, visual information is passed into a visual filter 314 that compares incoming material with spam samples from a spam database. Entries in the spam database are compared for projectivity plus gain congruence with incoming spam. What is meant by projectivity plus gain congruence is a congruence in the same orbit of the projectivity plus gain group of transformations, as described in the lead article of Proceedings of the IEEE, Vol. 86, No. 11.

The visual filter 314 will either ALLOW 316 or KLL 315 incoming visual information. A killfile may be comprised of spam, and killfiles may be shared among buyers who belong to a buyer protection network 170 or the like. Individuals with similar tastes may subscribe to similar killfile mailings, or the like, and filter out billboards in a manner similar to the web-based filters used to block offensive web sites. However, this embodiment of the invention differs from the prior art in the sense that this invention pertains to filtering out spam from the read world, rather than filtering out spam from cyberspace.

After offensive material is removed from the scene, what has been ALLOWed 316 is passed to a second visual filter 317 that forms the basis for a buyer controlled auction. The buyer who is looking for products to buy sells his or her visual attention span, instead of allowing the visual attention commodity to be stolen by sellers.

Visual filter 317 operates in conjunction with a visual attention broker 370. Visual attention broker 370 creates proposals that turn the buyer into a seller of a new commodity, namely his or her own visual attention, rather than allowing this visual attention to be stolen without payment. The buyer who is ordinarily bombarded with advertisements about products he or she can buy now sells his or her visual attention to the seller of the products, or a representative of the seller of the products.

Visual attention broker 370 takes a lightspace representation of the photoquantity within a portion of the field of view of the person wearing the apparatus, and converts this lightspace into an image by way of dynamic range compressor 371. The image material is then passed on to proposal generator 373 which creates scenarios for sellers of products who wish the wearer of the apparatus to buy these products, or at least to become aware or these products.

The wearer of the apparatus sends out proposals 374 to various vendors and suppliers, offering to view their ads for a certain price each.

Because of the complicated nature of the wearer's preferences (e.g. the complicated nature of human nature), the auctioning of visual attention is weighted by auction weighter 372. This weighting arises by virtue of the fact that different kinds of ads are such that the wearer can charge the seller more money if the seller wants the wearer to see these ads. The cost the wearer suggests may depend on market value as well as the wearer's preferences. An auction weighing list might appear as follows:

relevant pass through=0 cents
relevant insertion=0 cents+1 cents % (cent) processing fee
relevant=hard drives, RAM, ASUS motherboard with SCSI
irrelevant pass through=5 cents
irrelevant insertion=5 cents+1 cents % (cent) processing fee
irrelevant=soft drinks, food, groceries, household goods
offensive pass through=oo cents
offensive insertion=oo cents+1 cents % (cent) processing fee
offensive=alcohol, naked people, swimwear, underwear, deadbeat dads, columbus, condomwoman Thus relevant ads (e.g. ads that are newsworthy to the wearer) pass through freely, whereas insertion of relevant material onto the real world is passed through at cost. In this example, the cost is one cents (one cent, with the plural form "cents" still used to avoid screen flicker as financial values fluctuate around the 1.0 cent point whereupon the letter "s" in "cents" would otherwise flicker on and off creating distracting motion artifacts). In the above table, the percent sign, "%" denotes a comment field. Irrelevant ads (e.g. ads that the wearer funds neither newsworthy nor offensive) are passed through at a higher cost, or inserted at the higher cost plus the insertion fee. Offensive ads are blocked by setting the viewing fee to oo. An infinite viewing fee encodes unconditional ad blockage.

The above table may be displayed by the wearer, through the capabilities of lightspace synthesizer 330 alone, or by way of lightspace synthesizer 330 in conjunction with light space analyzer 310 to stabilize the table on any real world object or objects. Thus the wearer can look at a blank wall of a building, and caused the above table to appear as an illusory rigid planar patch upon this blank wall, where the wearer can also edit this table.

The table of ads and ad categories may make reference to specific ads, or classes of ads, such as alcohol ads, swimwear ads, underwear ads, etc. New ads that the wearer finds offensive or distracting may be added to the list by the wearer, or by other members of his or her collective, or buyer protection network 170, or other entity sharing similar tastes. For example, some people have found the so-called "deadbeat dads" ads to be offensive in the sense that they stereotype men as irresponsible. Therefore these ads can be added into a category of that heading, to be deleted or replaced by ads depicting irresponsible parents without reference to a specific gender of patient. Similarly, the ads celebrating the 500th anniversary of Christopher Columbus "discovering" America were found by some people to be insensitive to the indigenous peoples already living in America before his "discovery". Therefore members of this class of advertisement may be added into a killfile that may be referenced under the heading "columbus". The ads for condoms, particularly the one showing a woman wearing nothing but a bra, with a condom placed partially under one cup of the bra, may be placed into a killfile under the heading "condomwoman", and this entire killfile may be referenced by heading name, and thus all members of this set can be included in the "offensive" category.

Other killfiles can be included, such as a killfile containing swimwear ads, one containing underwear ads, etc., and these killfiles can be situationally included. For example, the apparatus can sense the activity of the wearer, so that the wearer can program the device to block swimwear and underwear ads while the wearer is driving a car (or doing another specific activity that requires concentration). Ads can also be ranked, e.g. particularly seductive or otherwise distracting material can be filtered out during tasks that require concentration.

The wearer can also add new ads into a killfile, or start a new killfile. Generally ads may be entered into the killfile by looking at them and selecting them. In this way, each ad need only be viewed once, and then, if the wearer so desires, may be never seen again.

Ads corresponding to matters of interest to the wearer are considered news. In this example, the wearer is currently heading out to by a new hard drive, some RAM, and an ASUS motherboard with onboard SCSI. Since the wearer is actually en route to purchase these items, billboards and advertisements depicting these items are actually newsworthy at this particular time. Therefore this matter passes through freely.

Other categories include irrelevant matter that is neither offensive nor newsworthy to the wearer. These might include soft drinks, groceries, household items, and other neutral subject matter. For viewing these neutral ads, the wearer solicits a small payment from each of a variety of product vendors.

For example, the wearer's auction weighter 372 automatically prepares a proposal to PEPSI COLA corporation, offering to view the PEPSI billboard 360 for 5 cents. If PEPSI pays the wearer 5 cents, the PEPSI billboard 360 gets allowed by visual filter 317 and the wearer sees the billboard. If PEPSI doesn't pay the wearer 5 cents, the PEPSI billboard 360 gets blocked or replaced by other subject matter, such as the wearer's favorite. Holzer quote, or perhaps a personal message to the wearer from his or her spouse. PEPSI is given a preview 364 of how the wearer will experience the ad, and in what context (e.g. showing the blocked BACARDI advertisement, etc.). The image 365 of PEPSI billboard 360 serves to allow PEPSI to determine how much of the wearer's visual field of view is occupied by the proposed advertisement offer. Additionally, PEPSI is offered the chance to purchase a hyberlink 366 for an additional 10 cents. A hyberlink is a real world hyperlink that hibernates on the billboard until the wearer of the apparatus looks at the billboard or looks at the billboard and activates the billboard with his or her PoP terminal.

In a preferred embodiment of the hyberlink system, the wearer looks at the billboard and puts it in the center of his or her field of view, while clicking on a small switch in his or her PoP terminal. A hyberlink is very similar to a hyperlink on the world wide web, except that the hyberlink is in the real world, not cyberspace.

If the wearer of the apparatus clicks on the hyberlink (assuming PEPSI has chosen to pay the wearer for viewing the hyberlink), an animated PEPSI advertisement comes to life in the real world, together with directions on how to get to the nearest PEPSI vendor. The wearer's visual perception of reality is altered in such a way that the wearer sees a clear marking on the road or sidewalk leading to the nearest PEPSI vendor.

If the wearer responds to the PEPSI ad with a thirst for PEPSI, the wearer simply follows the directions embodied in the altered perception of reality, to the nearest PEPSI vendor, and then uses his or her PoP terminal to make the purchase.

It is anticipated that many of these ad viewing transactions would operate computationally without human intervention, except perhaps to spot check the occasional proposal preview 364 and image 365, while assuming all the others are acceptable to the general spirit of the product seller's relationship with the wearer.

At the same time, auction weighter 372 automatically prepares a proposal to COCA COLA corporation, offering to replace the PEPSI billboard 360 with a COKE billboard of COCA COLA's choice within certain limitations, such as not offending the wearer by making reference to alcohol or inserting an ad depicting unclothed or scantily clad individuals. The terms of these negotiations are automatically generated to suit the wearer's preferences, and a contract is offered to COKE for replacement of this, and possibly future PEPSI billboards with COKE billboards.

The cost of viewing the COKE replacement to PEPSI billboard 360 is 6 cents for this one time. The extra cent is to cover the computational cost of rendering the replacement, and a service charge for altering the wearer's visual perception of reality. A portion of this one cent charge goes toward reality mediation insurance, to indemnify the wearer from harm that may arise from visual distractions in excessively aggressive advertisement, or in system malfunction whether deliberate on the part of COCA COLA corporation or accidental. Thus modifying the wearer's reality stream involves a small additional cost, in addition to the cost of having the wearer view the advertisement. COCA COLA is given the chance to preview the proposed ad replacement 368, within the visual context preview image 367. COCA COLA corporation is also offered the opportunity to purchase a hyberlink 369 for 10 cents.

Advertisements that the wearer does not consider to be spam may be replaced by other advertisements that are also not considered to be spam by the wearer. For example, if the wearer were a computer hobbyist, he or she might consider a SEAGATE advertisement to be newsworthy, and also a REDHAT Linux advertisement to be newsworthy. Since REDHAT is of interest to the wearer, a hyberlink 357 is offered for only 3 cents. The hyberlink 357 is not free of charge because of the cost of providing reality mediation insurance, and the cost of rendering the animated reality mediation of the real world perception of visual reality.

Bids 384 return from the various sellers and product vendors, and pass to visual attention vendor 380. Visual attention vendor 380 communicates with personal cash verifier 385. Personal cash is the unit of currency that the wearer collects for viewing advertisements. Preferably pcash may be directed into payment container 120, even if it is not of the same form as payment 130. Preferably therefore, the wearer might, for example, be able to obtain a free coke in exchange for looking at some coke ads.

Once the personal cash is verified, the visual attention vendor generates an image mix, including bitmap images it may have received from the vendors of various products. These bitmap images are converted to lightspace by expander 375 and added into the wearer's reality stream by lightspace adder 334. Lightspace adder 334 sends the visual information, complete with inserted ads to destabilizer 333. Destabilizer 333 restores the natural motion to the sense to make it match what would normally pass through to the eye (e.g. ordinarily images entering the eye are in wild motion due to eye movement, body movement, etc., and are not the still images that are presented to the vendors). The output of destabilizer 333 is fed to compressor 332 so that the resulting imagespace signal 331 will be compatible with lightspace synthesizer 330. This completes the journey from rays of light incident upon lightspace analyzer 310 on through to collinear rays of light reconstituted by lightspace synthesizer 330.

The combination of lightspace analyzer 310 and lightspace synthesizer 330 may function as a camera, where analyzer 310 functions as the camera and synthesizer 330 as its viewfinder. Therefore, the headgear of FIG. 3 may function as identifier 150 of FIG. 1*b*. Similarly, expanders 312 and 375, compressors 332 and 371, stabilizer 313, visual filters 314 and 317, visual attention broker and vendor 370 and 380, auction weighter 372, proposal generator 373, personal cash verifier 385, and destabilizer 333, etc., can be embodied as part of wearable computer 142 of FIG. 1*b*.

So far, aspects of the invention have been directed to visual information processing systems.

FIG. 4 depicts a safety wallet with DNA sampler. The wallet picks up residue from being handled by, or in the presence of, a seller. In this embodiment, the seller is also photographed with camera 410 when the wallet opens. Flashlamp 420 is responsive to a synchronization signal from camera 410. Camera 410 transmits images over transceiver 141 to a plurality of remote locations.

To the extent that only dishonest or corrupt sellers fear accountability, it may suffice to have only the flashlamp 420 without the camera 410, so as to create the element of fear among the dishonest. In many of these embodiments, a large number of fake units that look like the real ones, with only a few real units, would suffice to frighten corrupt sellers, forcing them to remain on their best behaviour at all times since they would never know whether or not they are being remotely monitored or the like.

FIG. 5 depicts an embodiment of the invention built into a wristwatch 500. Camera 510 may be aimed by the wearer who is looking at screen 520, such that camera 510 can be used to take a high quality picture or video of an vendor, seller, or manager standing binding a counter or the like. Wristwatch 500 may be aimed by setting the wrist upon a counter in a natural fashion, so that a picture of an official may be taken without the knowledge of the official.

In some embodiments of the invention, a cable 560 is connected to a wearable computer 570. Wearable computer 570 comprises battery pack 572, computer cpu 574, and communications system 576 which transmits pictures by way of antenna 578. Preferably images are transmitted by FTP (file transfer protocol) of PTP (Picture Transfer Protocol) to special incoming-only accounts so that the user of the wristwatch cannot delete them (and therefore cannot be forced against his or her will to delete the pictures).

In another embodiment of the invention, all components may be built directly inside wristwatch 500 rather than using a separate wearable computer.

Wristwatch 500 contains a second camera 550 which will take a picture of an official who asks to see the wearer's wristwatch. The wristwatch is also equipped with a fingerprint scanner 200 which the wearer can ask an official to press in order to view his or her online electronic identification. In this way the user can use the wristwatch embodiment of the invention as an electronic purse to make a purchase and record the process of the purchase by way of cameras and fingerprint scanner 200.

From the foregoing description, it will thus be evident that the present invention provides a design for a personal Point of Purchase terminal to empower the buyer by allowing the buyer to direct at least some aspects of the logistics of the process of buying and selling goods or services. As various changes can be made in the above embodiments and operating methods without departing from the spirit or scope of the invention, it is intended that all matter contained in the above description or shown in the accompanying drawings should be interpreted as illustrative and not in a limiting sense.

Variations or modifications to the design and construction of this invention, within the scope of the invention, may occur to those skilled in the art upon reviewing the disclosure herein. Such variations or modifications, if within the spirit of this invention, are intended to be encompassed within the scope of any claims to patent protection issuing upon this invention.

What I claim as my invention is:

1. A portable or wearable Point of Purchase terminal for use by a buyer, comprising:
   a personal space for containing payment,
   payment contained by said personal space,
   an identifier, for identifying at least one of:
      an identifying feature of a seller,
      an evidentiary aspect of a seller's establishment
   said identifier operable in conjunction with providing said payment to said seller, said Point of Purchase terminal including a processor and a housing having a visual display, where said visual display is responsive to an output of said processor.

2. The Point of Purchase terminal described in claim 1, wherein said identifier includes a camera, said camera activated when said personal space is opened.

3. The Point of Purchase terminal described in claim 1, further including wireless communication for communicating with a buyer protection network.

4. The Point of Purchase terminal described in claim 3, where said identifying feature of a seller, or said evidentiary aspect of a seller's establishment, is transmitted and recorded at at least one remote location, by way of said wireless communicator.

5. The Point of Purchase terminal described in claim 1, said identifier embodied as a function of a reality mediator, said reality mediator including a visual filter for filtering out unwanted advertisements.

6. A buyer-controlled purchasing system, including the Point of Purchase terminal of claim 1, said purchasing system also including a reality mediator, said reality mediator including a visual attention broker.

7. A buyer-controlled purchasing system, including the Point of Purchase terminal of claim 1, said purchasing system also including a visual filter, and at least one of a visual attention broker, a stabilizer and destabilizer, a dynamic range expander and compressor.

8. A Point of Purchase terminal for use by a buyer, comprising a personal space for containing payment, payment contained by said personal space, an identifier, for identifying at least one of:

an identifying feature of a seller, an evidentiary aspect of a seller's establishment, said identifier operable in conjunction with providing said payment to said seller, said Point of Purchase terminal further including a wrist worn housing having a visual display, a processor or computer, and a camera, where said visual display is responsive to an output of said processor or computer, and said processor or computer is responsive to an output of said camera.

9. The Point of Purchase terminal described in claim 1 where said personal space may be rendered unopenable by said buyer, said personal space remaining openable by said seller.

10. The Point of Purchase terminal described in claim 9 where said identifier is activated when said seller opens said personal space.

11. A Point of Purchase terminal for use by a buyer, comprising a personal space for containing payment, payment contained by said personal space, an identifier, for identifying at least one of:

an identifying feature of a seller, an evidentiary aspect of a seller's establishment, said identifier operable in conjunction with providing said payment to said seller, where said payment includes a buyer anonymity protector.

12. The Point of Purchase terminal described in claim 1 where at least some components of said Point of Purchase terminal are tethered to said buyer by a security tether.

13. A Point of Purchase terminal for use by a buyer, comprising a personal space for containing payment, payment contained by said personal space, an identifier, for identifying at least one of:

an identifying feature of a seller, an evidentiary aspect of a seller's establishment, said identifier operable in conjunction with providing said payment to said seller, at least some components of said Point of Purchase terminal being tethered to said buyer by a security tether, where said tether is a wireless chemical tether.

14. The Point of Purchase terminal described in claim 11 where said personal space is a container for carrying at least some cash.

15. A system including the Point of Purchase terminal described in claim 1 where said system further includes a computer or processor.

16. A Point of Purchase terminal for use by a buyer, comprising a personal space for containing payment, payment contained by said personal space, an identifier, for identifying at least one of:

an identifying feature of a seller, an evidentiary aspect of a seller's establishment, said identifier operable in conjunction with providing said payment to said seller, where said identifier includes a card reader to read the identity of a seller, as alleged by a seller bearing an identity card.

17. A Point of Purchase terminal for use by a buyer, comprising a personal space for containing payment, payment contained by said personal space, an identifier, for identifying at least one of:

an identifying feature of a seller, an evidentiary aspect of a seller's establishment, said identifier operable in conjunction with providing said payment to said seller, where said identifier includes a reader to read a seller's vendor's permit, said vendor's permit embodied in an electronic device carried by, worn by, or implanted in said seller.

18. A Point of Purchase system comprising:

a container for payment, payment contained in said container, a lock for said container which cannot be opened by an owner of said container, during certain times in at least one mode of operation of said Point of Purchase system, a processor or computer, an identifier for acquiring at least a portion of an evidentiary trail from a seller or seller's establishment, an operational concealing system for concealing whether said lock is responsive to an input from said identifier, or whether said lock is unlocked voluntarily by said buyer.

19. The Point of Purchase terminal described in claim 18, where said personal safety system further includes chemical protection means for deterrence of the bypassing of said lock by an attacker.

20. A buyer-controlled purchasing system for preventing the theft of visual attention or mental visual processing resources, said purchasing system including a reality mediator and a visual filter, and at least one of a visual attention broker, a stabilizer and destabilizer, a dynamic range expander and compressor.

21. The buyer-controlled purchasing system of claim 20, including a dynamic range compressor having an equation given by:

$$f(q)=(e^b q^a/(e^b q^a-1))^c \qquad (0.11)$$

22. The buyer controlled purchasing system of claim 20, further including means for conditional blocking of advertisements, said means responsive to payment to the wearer of said apparatus, advertisements being blocked when said payment is not received, and allowed when said payment is received.

23. The buyer-controlled purchasing system of claim 20, further including means for conditional mediation of the visual perception of advertisement, by a wearer of said system, said means responsive to payment to the wearer of said apparatus.

24. The buyer-controlled purchasing system of claim 20, further including means for insertion of hyberlinks into the visual reality stream of a wearer of said system, said means responsive to input from a Point of Purchase terminal operable by said buyer, said Point of Purchase terminal containing payment for items depicted by said hyberlinks.

25. A portable or wearable Point of Purchase terminal for use by a buyer, comprising:

a personal space for containing payment, payment contained by said personal space, an identifier, for identifying at least one of:

an identifying feature of a seller, an evidentiary aspect of a seller's establishment, said identifier operable in conjunction with providing said payment to said seller, said Point of Purchase terminal including a processor and a housing having a visual display, where said visual display is responsive to an output of said processor.

26. A portable or wearable Point of Purchase terminal for use by a buyer, comprising:

a personal space for containing payment, an identifier, for identifying at least one of:
an identifying feature of a seller,
an evidentiary aspect of a seller's establishment, said identifier operable in conjunction with providing said payment to said seller, and Point of Purchase terminal including a processor, a camera, and a housing having a visual display, where said visual display is responsive to an output of said processor, and said processor is responsive to an output of said camera.

27. A portable or wearable Point of Purchase terminal for use by a buyer, comprising:

a personal space for containing payment, a body-worn computer, a body-worn camera for identifying at least one of:
an identifying feature of a seller,
an evidentiary aspect of a seller's establishment, a body-worn information display, said camera operable in conjunction with providing said payment to said seller, where said visual display is responsive to an output of said processor, and said processor is responsive to an output of said camera.

28. A portable or wearable Point of Purchase terminal for use by a buyer, comprising:

a personal space for containing payment, payment contained by said personal space, an identifier, for identifying at least one of:
an identifying feature of a seller,
an evidentiary aspect of a seller's establishment, said identifier operable in conjunction with providing said payment to said seller.

* * * * *